No. 808,898. PATENTED JAN. 2, 1906.
R. S. CATES.
ICE MACHINE.
APPLICATION FILED NOV. 10. 1904.
2 SHEETS—SHEET 1.
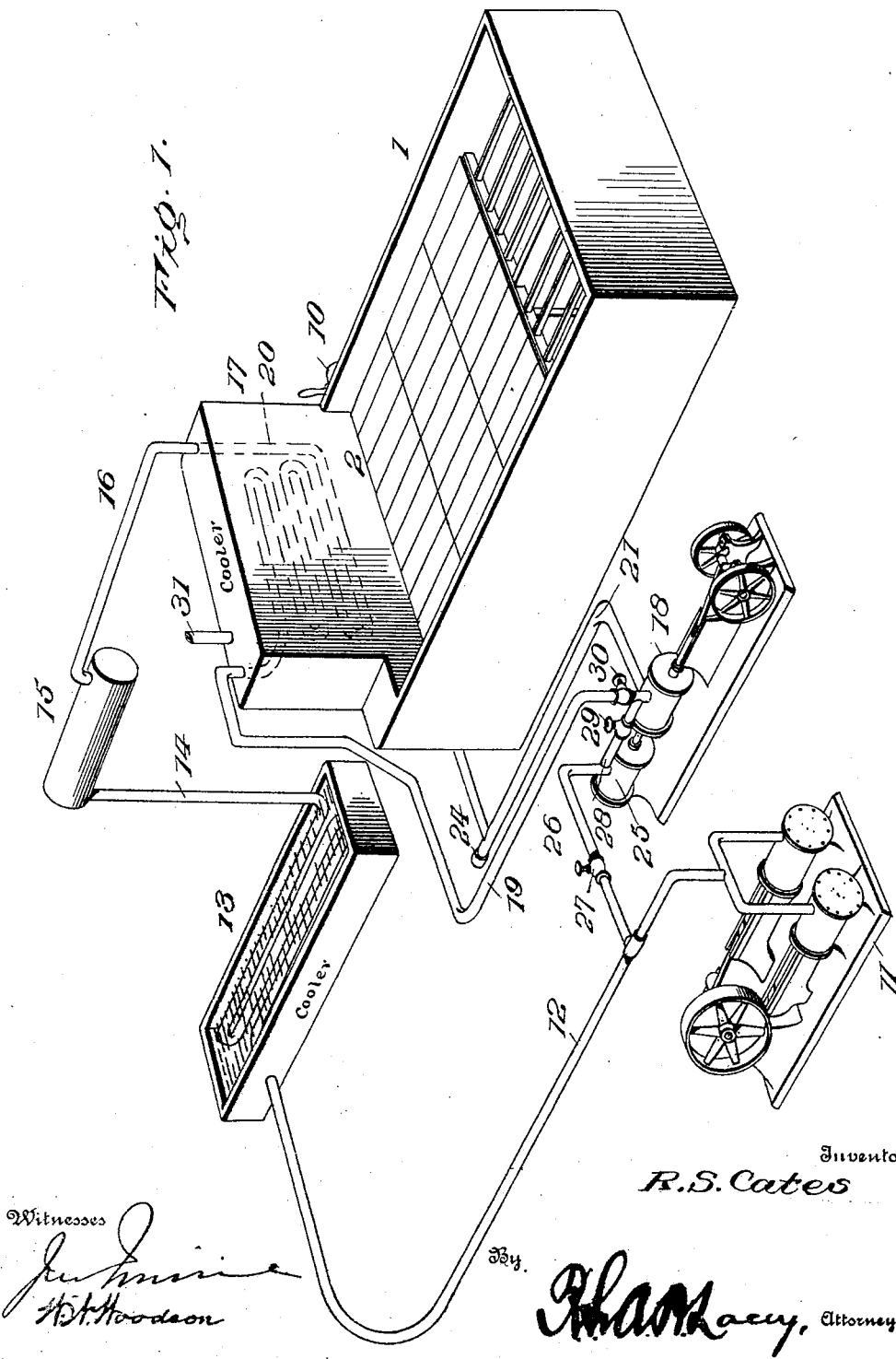

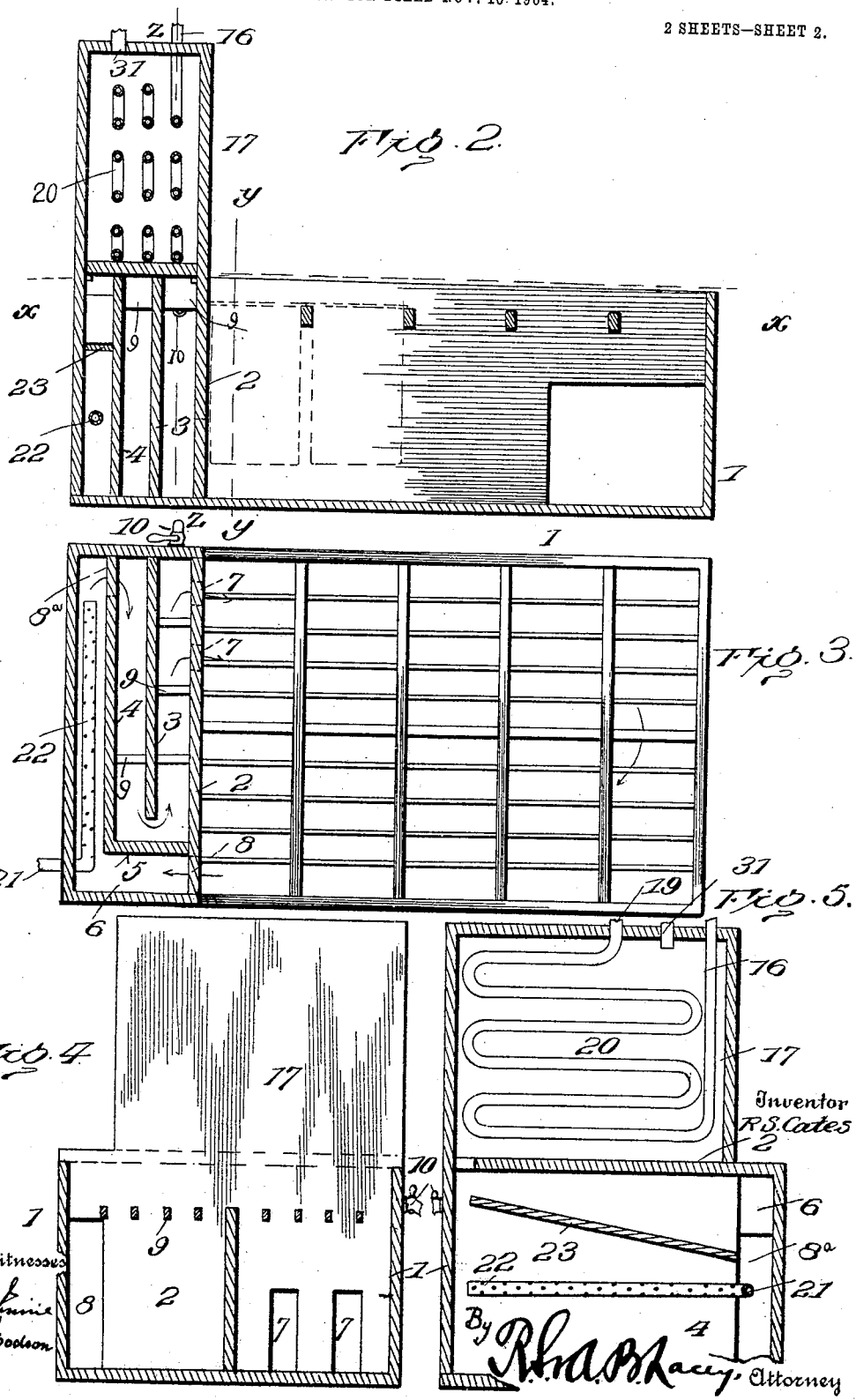

UNITED STATES PATENT OFFICE.

ROBERT S. CATES, OF KINGMAN, KANSAS.

ICE-MACHINE.

No. 808,898. Specification of Letters Patent. Patented Jan. 2, 1906.

Application filed November 10, 1904. Serial No. 232,074.

*To all whom it may concern:*

Be it known that I, ROBERT S. CATES, a citizen of the United States, residing at Kingman, in the county of Kingman and State of Kansas, have invented certain new and useful Improvements in Ice-Machines, of which the following is a specification.

In the manufacture of ice ammonia has been universally used as the refrigerating medium and is objectionable because of the cost, the corrosive action on the pipes, the danger to attendants, and the tainting of the ice in the event of a leak.

This invention substitutes air for the objectionable ammonia agent and provides a novel apparatus to admit of the same being successfully and economically employed, the air being treated to bring about the resultant cold necessary to congeal the water in the freezing-tanks.

The apparatus disclosed is subsidiary to the method and is the result of devising means for effecting the several steps in the process.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a diagrammatic view of the instrumentalities comprising the machine. Fig. 2 is a vertical longitudinal section of the refrigerating-vat and cooler. Fig. 3 is a plan section on the line $x\ x$ of Fig. 2. Fig. 4 is a cross-section on the line $y\ y$ of Fig. 2. Fig. 5 is a transverse section on the line $z\ z$ of Fig. 2.

Corresponding and like parts are referred to in the following description and indicated in all the views of the drawings by the same reference characters.

The refrigerating-vat 1 is of usual construction and is adapted to receive the solution and the refrigerator-cans, said solution containing chlorid of calcium or other chemical agent to prevent its congealing at a comparatively low temperature. An end portion of vat 1 is provided with a transverse partition 2, forming a chamber into which the refrigerating agent is introduced and through which the solution contained in the vat is circulated in the operation of the machine. Other partitions 3 and 4 subdivide the cooling-chamber, the partition 4 being parallel to the end wall of the vat and with the partition 3 and having a short partition 5 at its inner end to form a passage 6 at one end of the cooling-chamber. A series of openings 7 are formed in the lower portion of the partition 2, near one end, and constitute outlets, and an opening 8 is formed in the opposite end portion of the partition to admit of the solution passing from the vat into the cooling-chamber through the passage 6. The circulation through the cooling-chamber from the vat is through the passage 6, thence around partition 4, through opening $8^a$, formed therein, and back through the chamber and around partition 3, thence through openings 7 back into the tank, as indicated most clearly by the arrows in Fig. 3. A series of baffles 9 are located about at the level of the solution in the vat and cooling-chamber. These baffles may consist of bars or plates, and their office is to retard any oil that may collect on the surface of the solution and prevent its commingling with the solution in its circulation. A cock 10 is fitted to a side of the cooling-chamber and enables the accumulated oil to be drawn off at stated intervals. A compressor 11, of any structural type, is provided for compressing the air and is adapted to be driven by any suitable power. A pipe 12 conveys the compressed air to a cooler 13, which consists of a tank provided with a coil through which the compressed air is circulated, water being supplied to the tank to effect the cooling. A pipe 14 connects the cooler 13 with a receiver 15, into which the compressed air when cooled is discharged. A pipe 16 connects the receiver 15 with a cooler 17, which is preferably an extension of the cooling-chamber at one end of the refrigerating-vat. An expanding-chamber 18 is connected by pipe 19 with the coil 20 of the cooler 17. The expander 18 consists, preferably, of an engine of the reciprocating type provided with a cut-off valve for shutting off the compressed air at a determined point in the stroke of the piston, whereby the latter may be driven to the limit of its stroke by the expanding force of the compressed air. The air in expanding in the cylinder of the expanding-chamber 18 is reduced to a very low temperature and when exhausted is conveyed by pipe 21 to a perforated pipe 22, arranged within the cooling-chamber at the end of the refrigerating-vat. The openings in the perforated pipe 22 are comparatively small to admit of the cold air being discharged in small jets, so as to commingle with the refrigerating solution and reduce the same to the required temperature for freezing the water in the refrigerating-cans. A board or plate 23 is arranged over the perforated pipe 22 and is upwardly inclined toward the discharge end of said pipe and serves to confine the solution and insure its circulation through the cooling-chamber. This board 23 acts in the capacity of a deflector and closes the space formed between the partition 4 and the end wall of the vat. A cap 24 closes an extension of the pipe 21 and when removed admits of any ice formed in the ports of the expanding-chamber 18 being blown off. An air-compressor 25 is operated by means of the force developed in the expansion of the air in the chamber 18, and a pipe 26 connects the compressor 25 with the pipe 12, so as to supplement the action of the compressor 11. A valve 27 is interposed in the length of the pipe 26 to control communication therethrough. A short pipe 28 connects the pipes 19 and 26 and is provided with a valve 29. A valve 30 is interposed in the length of the pipe 19 adjacent to the connection of the pipe 28 therewith.

In the operation of the machine the vat 1 is supplied with a chlorid-of-calcium solution or refrigerating medium, and the cans containing water to be frozen are suspended within the vat and are immersed in the solution contained therein. The compressor 11 is operated and the compressed air is conveyed by the pipe 12 to the cooler 13, thence to the receiver 15, to cooler 17, and to the expanding-chamber 18, where it is utilized for operating the compressor 25, and when exhausted from the expanding-chamber 18 is discharged into the cooling-chamber and reduces the temperature of the refrigerating solution and causes circulation thereof through the vat. The air after cooling the refrigerating solution is liberated therefrom and is received in the box or casing of the cooler 17 and may be discharged through pipe 31 or led to a cooling-room or other place for further use. The expanding-chamber 18 is, in effect, a motor, and in the event of its valves and ports becoming impeded by accumulation of ice the valve 30 is closed and the valve 29 opened and the cap 24 removed. This admits of warm air from the compressor 11 passing through pipes 12, 26, and 28 into the chamber 18 to dislodge the ice formations, which are blown out through the pipe 21. After the chamber 18 has been cleared the cap 24 is replaced, the valve 30 opened, and the valve 29 closed, thereby permitting the machine to operate in the manner stated.

Having thus described the invention, what is claimed as new is—

1. In an ice-machine, the combination of a refrigerating-vat, a cooling-chamber at one end thereof in communication therewith, vertical partitions subdividing the lower portion of the cooling-chamber to form a tortuous path therein, a horizontal partition closing the upper ends of the vertical spaces forming the said tortuous path and having a vertical outlet, a coil arranged in the upper portion of the cooling-chamber, means for circulating compressed air through said coil, a perforated pipe connected with the said coil and arranged within said tortuous path for injecting cold air into the cooling-chamber for reducing the refrigerating solution to the proper temperature for freezing and to insure circulation of said solution through the vat and cooling-chamber, and an inclined deflector arranged above the perforated pipe for confining the air and insuring its commingling with the solution.

2. In an ice-machine, the combination of a refrigerating-vat, an air-compressor, a cooler, an engine operated by expansion of the cooled compressed air, means for injecting the expanded air into the solution of the refrigerating-vat, an auxiliary air-compressor operated by means of the said engine, a valved pipe 26 connecting the auxiliary compressor with the air-pipe leading from the primary air-compressor, valved pipe 28 between the auxiliary air-compressor and its operating-engine, whereby compressed warm air may be admitted to the air-expansion engine to remove obstructing ice therefrom, substantially as specified.

In testimony whereof I affix my signature in presence of two witnesses.

ROBERT S. CATES.

Witnesses:
V. B. HILLYARD,
T. H. JOHNSTON.